April 21, 1964 E. W. MILLER 3,130,392

DESKEWING USING LAST BIT OF A BYTE

Filed Dec. 26, 1961 3 Sheets-Sheet 1

INVENTOR

EARL W. MILLER

BY Bernard M. Goldman

ATTORNEY

April 21, 1964 E. W. MILLER 3,130,392

DESKEWING USING LAST BIT OF A BYTE

Filed Dec. 26, 1961 3 Sheets-Sheet 2

April 21, 1964 E. W. MILLER 3,130,392

DESKEWING USING LAST BIT OF A BYTE

Filed Dec. 26, 1961 3 Sheets-Sheet 3

United States Patent Office 3,130,392

Patented Apr. 21, 1964

3,130,392

DESKEWING USING LAST BIT OF A BYTE

Earl W. Miller, Poughkeepsie, N.Y., assignor to International Business Machines Corporation, New York, N.Y., a corporation of New York Filed Dec. 26, 1961, Ser. No. 162,046
11 Claims. (Cl. 340—174.1)

This invention relates to means for deskewing bits intended to be read simultaneously from parallel tracks on magnetic tape or to be transmitted simultaneously on parallel communication channels. The term "byte of data" is often used to designate a group of data bits intended to be transmitted simultaneously in parallel.

Prior digital skew systems can only accommodate a maximum of one-half bit period of skew, unless they add at least one clock channel which is wasteful of tape, or add a complex data storage arrangement which is expensive.

Prior skew accommodation techniques, not using a clock channel, have been generally used with NRZI recording, which recognizes "one" bits as a pulse and "zero" bits as no pulse. Each NRZI character must have at least one "one" bit to permit recognition of its "zero" bits, which are assumed by the absence of a "one" bit in a channel during a one-half bit period following the first "one" bit of a character. An OR gate is used to detect the first "one" bit of the character. After the timing-out is complete, the prior technique assumes that all of the bits of the character have been registered. The bits are then read-out of the register simultaneously without skew.

Prior skew accommodation systems using one or more sprocket pulse channels can obtain up to one bit period of skew accommodation, only if the tape speed is maintained at an ideal constant rate. If the ideal rate is exceeded, the skew gate can bring in the first bit of the next character to cause an error. If the tape speed drops below the ideal rate, the skew period is reduced in value. This is because it is necessary to time out a fixed period after each sprocket pulse, which must not exceed one bit period at the maximum permissible tape speed. The difficulty with such systems is that one or more tape channels are wasted on storing and transmitting timing information only.

It is therefore the principal object of this invention to provide a system which can accommodate up to one bit period of skew without requiring any sprocket or clock channel.

It is another object of this invention to provide a system that can obtain its maximum skew accommodation of up to one bit period over all tape speed or character rate variations, and is therefore not dependent upon having a fixed tape speed to obtain maximum skew accommodation.

It is a further object of this invention to provide a skew accommodation system which eliminates jitter of the deskewed characters found in prior systems due to "first one" bit variation among characters.

Basically, this invention requires a discrete representation of a "one" or "zero" bit at each bit position in a character, or byte of data. This bit representation is found with recording or transmitting techniques which distinguish each "one" or "zero" from the no-bit condition, such as return-to-zero, frequency or phase recording or transmitting techniques known in the art. This can also be done with systems that record only "one" bits by providing a variable-frequency clock (VFC) with each channel (or at least with skew boundary channels) to define the position of each "zero" bit. The VFC is synchronized with the "one" bits of its channel and indicates within a block of information the position of each "zero" bit in the channel by the coincidence of a VFC pulse and no "one" bit. It may be necessary to precede each block of information with a few "one" bits in each channel to initially synchronize the respective channel VFC.

This invention includes means for recognizing the arrival of each bit, whether a "zero" or "one," in at least the skew boundary channels. These bits are registered, and the registered outputs are "Anded," which allows an output only when the last bit of a character has arrived. The "Anded" output is used to gate out all registered bits of the received character and to clear the register for the reception of the next character.

The foregoing and other objects, features and advantages of the invention will be apparent from the following more particular description of preferred embodiments of the invention, as illustrated in the accompanying drawings.

Figures 4, 5:
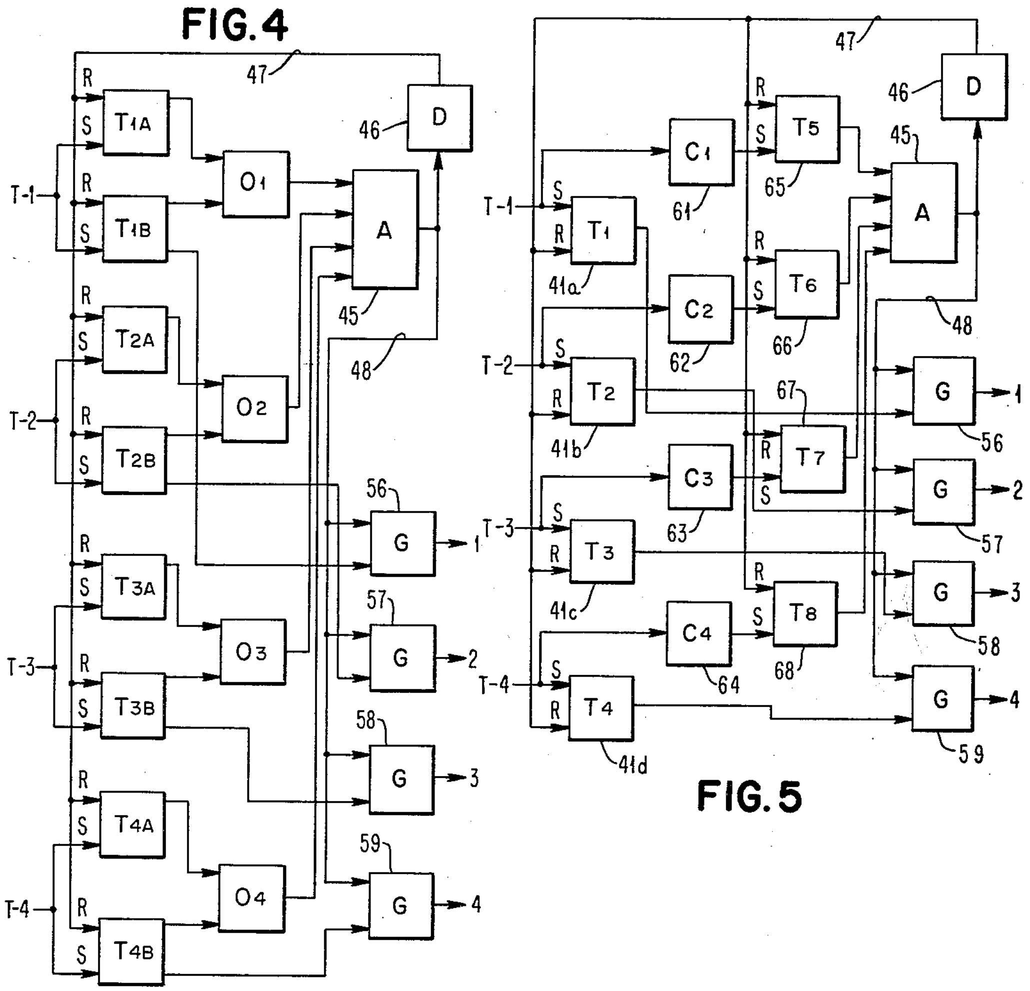
Figure 6:
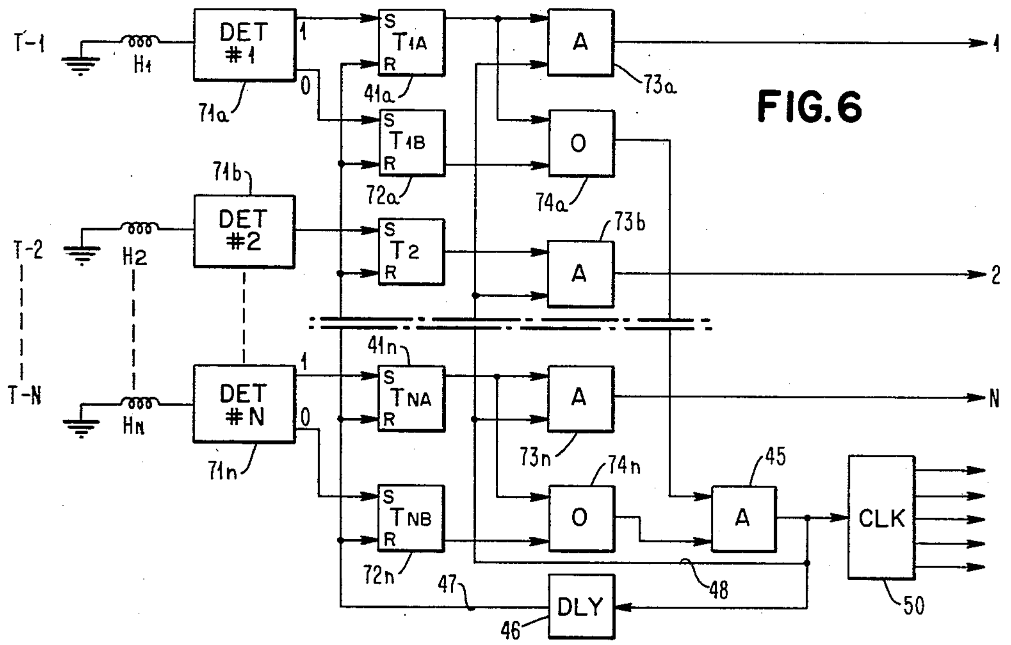

FIGURES 4, 5 and 6 provide different embodiments of this invention.

Figure 8:
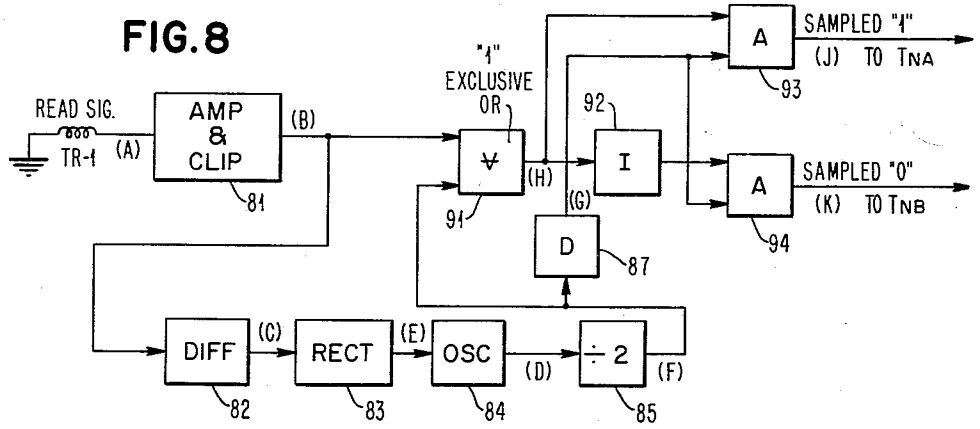
Figure 7:
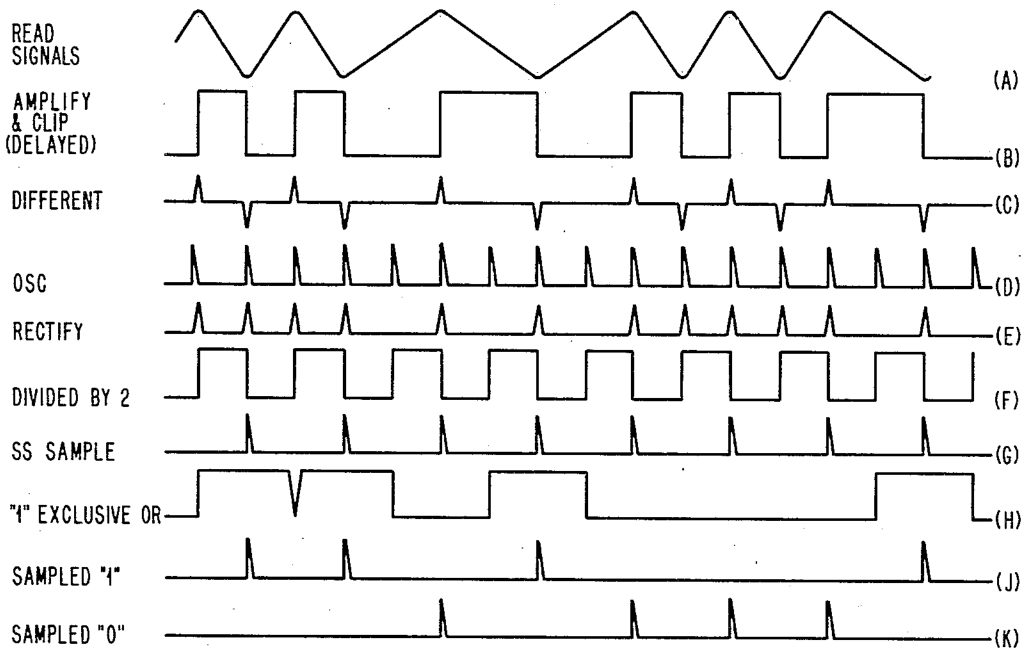

FIGURES 7 (A)–(K) illustrate waveforms associated with FIGURE 8.

FIGURE 8 illustrates a detection system using a variable frequency clock (VFC) which might be used with a recording on magnetic tape.

Figure 1:
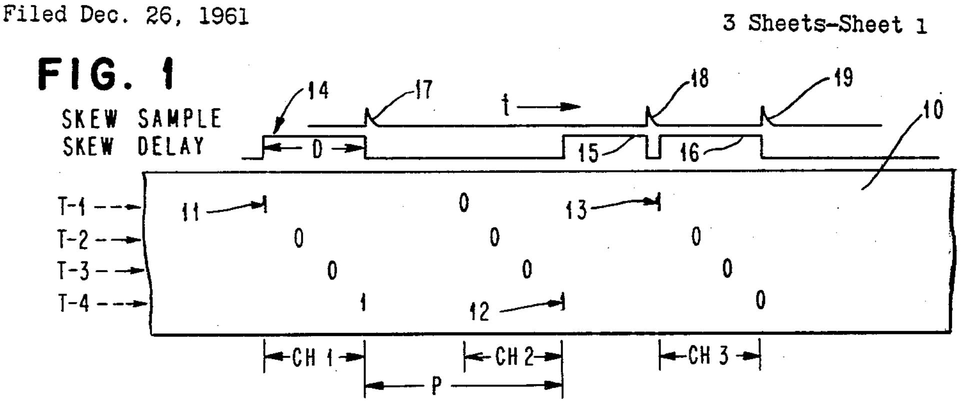
FIGURE 1 illustrates a section of magnetic tape representing skewed NRZI recorded characters, and associated waveforms.

An NRZI recorded section of magnetic tape is shown in FIGURE 1, wherein the tape is always magnetically saturated but polarity switching occurs for "one" bits only. Thus a flux reversal represents a "one" bit, and no flux reversal represents a "zero" bit, which is figuratively represented in FIGURE 1 by a 0.

Four tracks T–1 through T–4 are shown in FIGURE 1 for simplicity, but represent any number of tracks. Thus character 1 (CH 1) is illustrated by four skewed bits, of which "one" bit 11 is the first. It is the purpose of a skew accommodation circuit to line up these four bits timewise during ultimate transmission of the character. In FIGURE 1, P represents the average character period.

Figure 2:
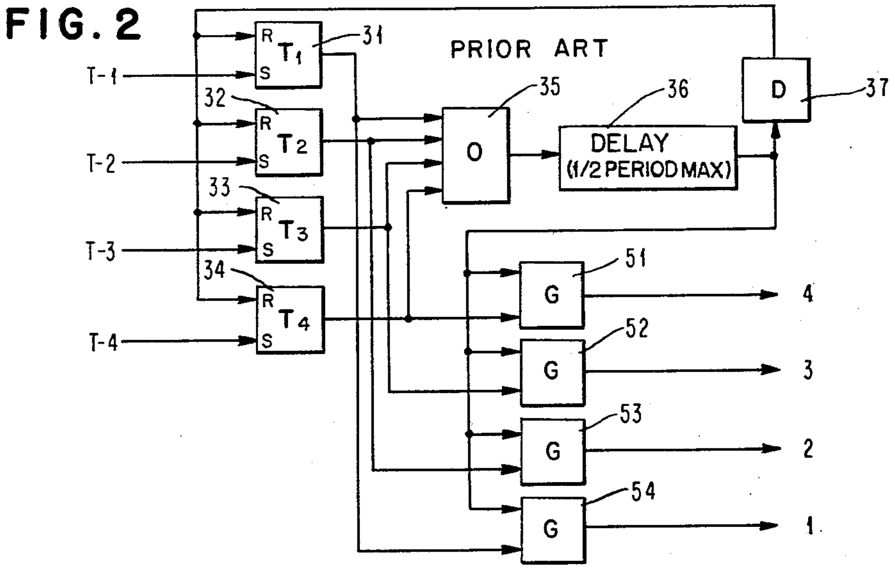
FIGURE 2 shows a prior art skew accommodation circuit used with the tape characters represented in FIGURE 1.

FIGURE 2 (labeled Prior Art) illustrates a conventional type of skew accommodation circuit given to assist an understanding of the inventive step made by the present invention. In FIGURE 2, a plurality of triggers $T_1$–$T_4$ respectively receive the outputs from read heads (not shown) on tape tracks T–1 through T–4. Thus each of triggers $T_1$–$T_4$ is "set" (S) by a "one" bit read from tape and is not "set" when a "zero" bit occurs. Furthermore, each of the triggers $T_1$–$T_4$ must be "reset" (R) prior to receiving each character so that the character can be registered therein. The outputs of all of the triggers are provided as inputs to an OR gate 35. A delay device 36 receives the output of OR circuit 35, and the first registered "one" bit of a received character actuates delay device 36, which might be a single-shot multivibrator or a delay line. Delay device 36 provides a delay which must not exceed one-half of character period P at the maximum tape speed of a transport unit. However at slower speeds, the delay will be a small fraction of character period P. Digital tape transports generally have tape speed variation of up to 10 percent while reading records. Sampling of data registered in triggers $T_1$–$T_4$ is done by a plurality of AND gates 51–54 which respectively receive the outputs of triggers $T_1$–$T_4$. Also each AND gate has another input connected to an output of delay device 36, which controls the sampling time. Thus at the end of each delay period, a simultaneous sampling of all gates 51–54 provides a pulsed output on those output leads 1–4 having gates 51–54 receiving "one" bits from triggers $T_1$–$T_4$. The duration of the pulsed outputs on leads 1–4 ends when triggers $T_1$–$T_4$ are reset by the termination of a short delay period by a second delay device 37. Thus the output of delay device 37 resets each of the triggers $T_1$–$T_4$ to condition them for reception of the next character. Accordingly, each output pulse on leads 1–4 has a duration controlled by the delay of device 37.

In FIGURE 1, pulses 14, 15 and 16 illustrate the delay period D of device 36 in response to characters 1, 2 and 3. Delay period D must be less than one-half of character period P. Pulses 17, 18 and 19 show the result from the trailing edges of delay periods 14, 15 and 16. Each delay period is started by the first "one" bit of a character such as bit 11 in character 1, which begins delay pulse 14 that terminates with pulse 17. Therefore, all bits of character 1 must arrive within period D if none of its bits are to be lost.

However, character 2 has its first and only "one" bit 12 as its last bit. It develops delay 15 terminating with sampling pulse 18. In this case, delay period 15 terminates just before the beginning of the next character 3. This illustrates why period D cannot be greater than half of period P. Character 3 includes a first "one" bit 13 which starts the delay period 16 terminating with sampling pulse 19.

Thus it can be seen from the distribution of sampling pulses 17, 18 and 19 that much jitter can occur for the deskewed output from the prior art circuit. This is due to the fact that the sampling time is a function of the position of the first "one" bit in a character which arbitrarily varies as a function of the data and can vary by as much as the maximum skew over period D.

Figure 3:
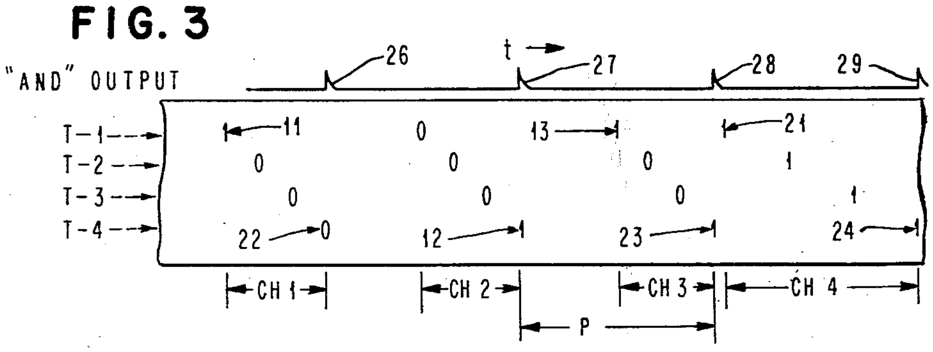
FIGURE 3 illustrates a tape having recorded thereon characters with varying amounts of skew, and an associated waveform.

FIGURE 3 illustrates a tape with the same channels as FIGURE 1, but with characters 1, 2, 3 and 4. Character 4 is skewed almost a full bit period while the other characters are the same as in FIGURE 1.

This invention differs in principle from the prior art circuit by using the last bit of a character to determine sampling of a receiving register. Accordingly this invention requires means for recognizing the last bit to a character, regardless of whether the last bit is a "zero" or a "one." In FIGURE 3, last bit 22 of character 1 is a "zero," and output pulse 26 is derived therefrom. Likewise with character 2, last bit 12 causes output pulse 27; with character 3, last bit 23 causes sampling pulse 28; and last bit 24 of character 4 causes sampling pulse 29. It can be seen in FIGURE 3 that sampling pulses 26–29 occur with substantially equal spacing and do not have the jitter which occurred with sampling pulses 17–19 in FIGURE 1 with the prior technique. This is because the last bit position of each character does not change as a function of arbitrary data variation. Generally, the skew variation from one character to the next is not great. Thus generally the skew changes slowly as characters move by a read head so that many characters occur before the skew changes by a substantial amount.

FIGURES 4 and 5 illustrate embodiments of the invention using the last bit principle. Inputs to each of these figures can likewise be provided from read heads (not shown) on respective tracks on magnetic tape, or they can be provided by plural data communication channels.

A basic difference between the inventive embodiments in FIGURES 4 and 5 and prior art system of FIGURE 2 is that FIGURES 4 and 5 include: (1) means for recognizing every bit position in a character, and (2) an AND gate 45 replaces both OR gate 35 and delay device 36 of FIGURE 2.

The system of FIGURE 4 operates with a "ternary" type of recording technique. "Ternary" herein means a binary recording technique having "one" and "zero" bit conditions which are distinguishable from a third recorded condition that represents "no bit." Thus, "return-to-zero" recording is "ternary" when it utilizes a positive plurality pulse of a "one" bit and a negative plurality pulse for a "zero" bit. In FIGURE 4, a pair of triggers $T_{NA}$ and $T_{NB}$ is provided for receiving the information from each track where N is any integer. Thus, triggers $T_{1A}$ and $T_{1B}$ have "set" inputs (S) receiving the information from track 1. Likewise, a similar pair of triggers is provided for each of the other tracks being read. Both triggers of any pair are in a "reset" state if no bit has been read from its track on tape. If a "one" bit is read, trigger $T_{1A}$ will be "set," while the other trigger, $T_{1B}$, of the pair is still in "reset" condition. On the other hand, if a "zero" bit is read from the tape track, then trigger $T_{1B}$ is "set" while trigger $T_{1A}$ remains "reset." An OR gate $O_N$ is provided with each trigger pair, $T_{NA}$ and $T_{NB}$, to indicate when a bit is read from its track, whether the bit is a "one" or "zero." Thus, OR gate $O_1$ provides an output only if one or the other of its pair of triggers has been set by a bit read from its tape track. If no bit is read, both triggers $T_{1A}$ and $T_{1B}$ remain in a "reset" condition which does not cause any output from OR gate $O_1$. Similarly, OR gates $O_2$, $O_3$, and $O_4$ have inputs connected to respective pairs of triggers operating with tracks T–2, T–3, T–4 to indicate the occurrence of bits in those tracks.

Whenever a character passes beneath the heads reading tracks T–1 through T–4, one trigger in each pair in FIGURE 4 can be set at a different time because of skew. As one trigger in each pair is set, the corresponding OR gate provides an output to AND gate 45, which however cannot provide an output until all of its inputs are conditioned by all of OR gates $O_1$–$O_4$. As a result, all inputs to AND gate 45 are conditioned only after the last bit of a character has been read in order to recognize the last bit.

Once a bit condition has been recognized by any pair of triggers $T_{NA}$ and $T_{NB}$, only one trigger of the pair is needed to signify the bit status; since the other trigger is then in a complementary status with respect to the particular bit. Hence, only outputs from triggers $T_{1B}$, $T_{2B}$, $T_{3B}$ and $T_{4B}$ are utilized for sampling data for read-out by gates 56–59 respectively. It is to be recalled that when no bit is received, the triggers in a pair will not have complementary outputs, but both will be in "reset" condition.

As soon as AND gate 45 is activated by the last bit of a character, its output starts a sampling by gates 56–59 of the data registered in the triggers. The sampling occurs during the short period of delay means 46 which is only a very small fraction of a bit period P. After the delay of means 46, its output resets all of the triggers in the respective pairs.

FIGURE 5 provides an embodiment which can be used with pure binary recording techniques, as well as recording techniques previously described herein as "ternary." FIGURE 5 includes a clock $C_N$ with each track to recognize the time position of each bit read from a respective track. The clock, for example, may be a phase-locked oscillator which is synchronized with the "one" bits read from the track. Thus, in FIGURE 5, clocks $C_1$–$C_4$ connect respectively to transmission lines providing data from tracks T–1 through T–4 respectively. Also, each of triggers $T_5$ through $T_8$ has its "set" input connected to the output of its respective clock $C_1$–$C_4$. Therefore each of triggers $T_5$–$T_8$ is set when a bit is expected to occur on its track, regardless of whether the bit is a "one" or "zero." However, the no bit condition must be recognized by other means, such as by recognizing sequential "all zero character bit combinations."

Hence, in FIGURE 5, a clock and two triggers correspond to each pair of triggers found in FIGURE 4. AND gate 45 and delay means 46 however serve the same function in FIGURE 5 as they do in FIGURE 4.

The output of delay means 46 resets each of triggers $T_1$–$T_8$ so that the system is prepared to receive the next character.

Consequently, the system of FIGURE 5 may be used with any recording or modulating system, such as amplitude, pulse position, frequency or phase modulation, as long as detection is provided to convert the data into a form usable in FIGURE 5.

FIGURE 6 illustrates a simplification of the embodiment in FIGURE 4 by recognizing that in most situations the extreme skew positions are found on the outside tracks of a tape. Thus, for a tape having tracks 1 through N, trigger pairs for recognizing the existence of an "any bit" condition need only be provided for the two outside tracks, which are the first and Nth tracks. Each of the other tracks need only have a single trigger register. Thus, in FIGURE 6, a detector 71*a* through 71*n* is connected to each head $H_1$ through $H_N$ to detect the information being read from tape. The information is assumed in this embodiment to be phase recorded on tape, wherein a "one" bit is represented by a single flux cycle of one phase and a "zero" bit is represented by a single cycle of opposite phase. This type of phase recording can be accomplished by means described on pages 180 and 181 of "Magnetic Tape Instrumentations" by Gomer L. Davies.

Accordingly, in FIGURE 6, AND gate 45 has only two inputs which are received from OR gates 74*a* and 74*n* that operate with the respective trigger pairs $T_{1A}$ and $T_{1B}$, and $T_{NA}$ and $T_{NB}$. Thus, AND gate 45 will be conditioned by the first and last bits of a character to recognize the ending of a character. Block 50 is triggered by the output of AND gate 45 to control the transfer of data after it leaves sampling gates 73*a*–73*n*. Otherwise, AND gate 45 and the overall circuit of FIGURE 6 is the same as the circuit in FIGURE 4.

Thus, in FIGURE 6 the output of AND gate 45 signals the complete reception of a character and to read out the character through AND gates 73*a*, 73*b* and 73*n*. Shortly thereafter the output of delay means 46 resets all of the triggers so that they are ready for the next character read from tape.

When the system is not used with data read from tape, but rather is used with a long distance communication link, same circuits described herein can be used. However, the skew characteristics of a communication link are generally dependent upon the bandpass time-delay characteristics of the communication link. Often their extreme skewed channels are not the outer channels, but are dependent upon the particular bandpass-phaseshift characteristics of the communication link. In such a case, it may be desirable to have three or more sets of triggers pairs which at least correspond to the three channels located at the center and extremes of the bandpass, for example, of a transmission line carrying tones upon which the channels are modulated.

A phase modulation technique is assumed to be used on tape being read for the embodiment of FIGURE 6. FIGURE 8 provides a detection circuit which can be used for each of the detectors 71*a*–71*n* in FIGURE 6. The waveforms (A)–(K) in FIGURE 7 illustrate waveforms that can be found at various points in the circuit of FIGURE 8 having corresponding letters. Thus, FIGURE 7(A) illustrates the waveform provided at the output of any read head in FIGURE 8. The wave is amplified and clipped by circuit 81 in FIGURE 8 to provide waveform 7(B) which represents the waveform originally used to record the data on tape. The output of clipper 81 is simultaneously provided: (1) to a differentiating circuit 82 which begins a series of events for reconstructing a reference wave against a phase comparison can be made for determining the information content of the wave read from tape, and (2) to one input of an Exclusive OR circuit 91, that receives the reference wave as its other input and detects the phase of the data being read. In essence, differentiator 82 provides the wave illustrated in FIGURE 7(C) which comprises pulses at the transitions of the wave in FIGURE 7(B). Rectifier 83 inverts the negative plurality pulses of FIGURE 7(C) to provide the output waveform illustrated in FIGURE 7(E). An oscillator 84 having a free-running frequency approximately twice the fundamental frequency of the data read from tape has an input connected to rectifier 83, so that oscillator 84 has its oscillations phase locked to the rectified pulses. Accordingly, FIGURE 7(D) illustrates the resulting pulsed output from oscillator 84. The oscillator output is then frequency divided by a factor of two in circuit 85, which may be a flip-flop triggered by each pulse provided from oscillator 84. Thus the output of frequency divider circuit 85 is synchronized with the data read from its tape track. Therefore, when a data cycle from clipper 81 is in phase with the reference wave from divider 85, a "one" bit is detected by circuit 91. On the other hand, if the cycle read from tape has an opposite phase, then the output of Exclusive OR 91 provides an opposite voltage level output to indicate a "zero" bit. The corresponding output of Exclusive OR 91 is illustrated by FIGURE 7(H).

It is noted in FIGURE 7(H) that an undesirable spike occurs in the output level of the Exclusive OR 91 when a sequence of one bits is provided.

A pair of gates 93 and 94 are provided to eliminate such spikes and also to provide outputs to the "set" inputs of a respective pair of triggers, such as $T_{NA}$ and $T_{NB}$ in FIGURE 6. These gates receive complementary outputs from Exclusive OR 91 through the use of an inverter 92 connected to AND gate 94. Sampling inputs to each of AND gates 93 and 94 are provided through a delay circuit 87 operated by the output of divider circuit 85. Delay 87 can be a single shot that forms pulses shown in FIGURE 7(G) from the negative-going parts of the wave form from the divider 85. The single-shot pulses are timed approximately midway between level changes at the output of Exclusive OR 91. The corresponding outputs of AND gates 93 and 94 are illustrated by waves 7(J) and 7(K).

While the invention has been particularly shown and described with reference to preferred embodiments thereof, it will be understood by those skilled in the art that the foregoing and other changes in form and details may be made therein without departing from the spirit and scope of the invention.

What is claimed is:

1. Means for deskewing bytes of data bits received from a plurality of channels,
   comprising means for registering data bits provided by each byte,
   and bit-presence detecting means associated with said register and at least a pair of said channels at boundary skew positions,
   AND gate means receiving outputs of said bit-presence detecting means,
   and means for sampling the output of said registering means in response to an output of said AND gate means.

2. Means for deskewing bytes as defined in claim 1,
   in which each of said bit-presence detecting means comprises a pair of triggers and an OR gate,
   inputs of said OR gate receiving outputs of said pair of triggers,
   and the output of said OR gate being the output of said bit-presence detecting means.

3. Means for deskewing bytes as defined in claim 2,
   in which said registering means includes one trigger of each bit-presence detecting means.

4. Means for deskewing bytes of data bits as defined in claim 1 in which said bit-presence detecting means comprises a first trigger and a clock receiving data from said channel and a second trigger set by an output of said clock, the output of said second trigger providing an input to said AND gate means, the output of said first trigger being included in said registering means, the output of said registering means being sampled in response to an output of said AND gate means to provide deskewed data in response to the reception of the last bit of each byte.

5. Means for deskewing bytes of data bits as defined in claim 1 in which said bit-presence detecting means is provided for opposite channels read from tape.

6. Means for deskewing bytes of data bits as defined in claim 1 in which said bit-presence detecting means is provided at least for channels expected to receive bits that are skewed farthest apart in any received byte.

7. A means for deskewing bytes of data bits as defined in claim 1 including a delay means providing a relatively short delay in comparison to a byte period, said delay means being connected between the output of said AND gate means and reset inputs of said bit-presence detecting means.

8. Means for deskewing bytes of received data bits comprising, bit-presence detecting means including a pair of triggers and a clock for each of said channels, means for synchronizing each clock with received data of its associated channel, means for setting one of said triggers in any pair in response to data bits of its channel, means for setting the other of said triggers in response to an output of said clock occurring at the instant of a received bit in its associated channel, AND gate means receiving the output of said second trigger for each channel, means responsive to the output of said AND gate means for sampling outputs of said first triggers to provide a deskewed output byte.

and delay means acting in response to the output of said AND gate means for resetting all of said triggers to condition them for the next byte.

9. Means for deskewing bytes of data bits in a plurality of channels, comprising means for detecting received bits in each channel, ternary means associated with each of said channels for registering the bit condition of each received bit or the absence of a bit, AND gate means having a plurality of inputs respectively connected to bit-presence outputs of said ternary means, an output of said AND gate means indicating the reception of the last bit of each received byte, and means for reading out data registered in said ternary means in response to said output of said AND gate means to provide a deskewed byte.

10. Means for deskewing bytes of data bits as defined in claim 9, further including delay means for resetting said ternary means to a no information state in response to said output of said AND gate means.

11. Means for deskewing bytes of data bits as defined in claim 9 in which said ternary means comprises a pair of triggers, one of said triggers being settable in response to a received bit of one type from its channel, the other of said triggers being settable in response to a received bit of another type from its channel, neither of said triggers being settable in the absence of a received bit from its channel, and an OR gate receiving outputs of said trigger pair and passing them to an input of said AND gate means.

No references cited.

Notice of Adverse Decision in Interference

In Interference No. 94,463 involving Patent No. 3,130,392, E. W. Miller, DESKEWING USING LAST BIT OF A BYTE, final judgment adverse to the patentee was rendered Sept. 24, 1965, as to claims 1, 5, 6 and 7.

[*Official Gazette December 14, 1965.*]